July 7, 1925.  
F. F. SMALL ET AL  
1,545,360  
MULTIPLE SPEED PLANETARY GEAR TRANSMISSION MECHANISM  
Filed May 29, 1924  4 Sheets-Sheet 1

INVENTORS  
Fred F. Small,  
Carl C. Nagel,  
BY  
Booth & Small  
ATTORNEYS

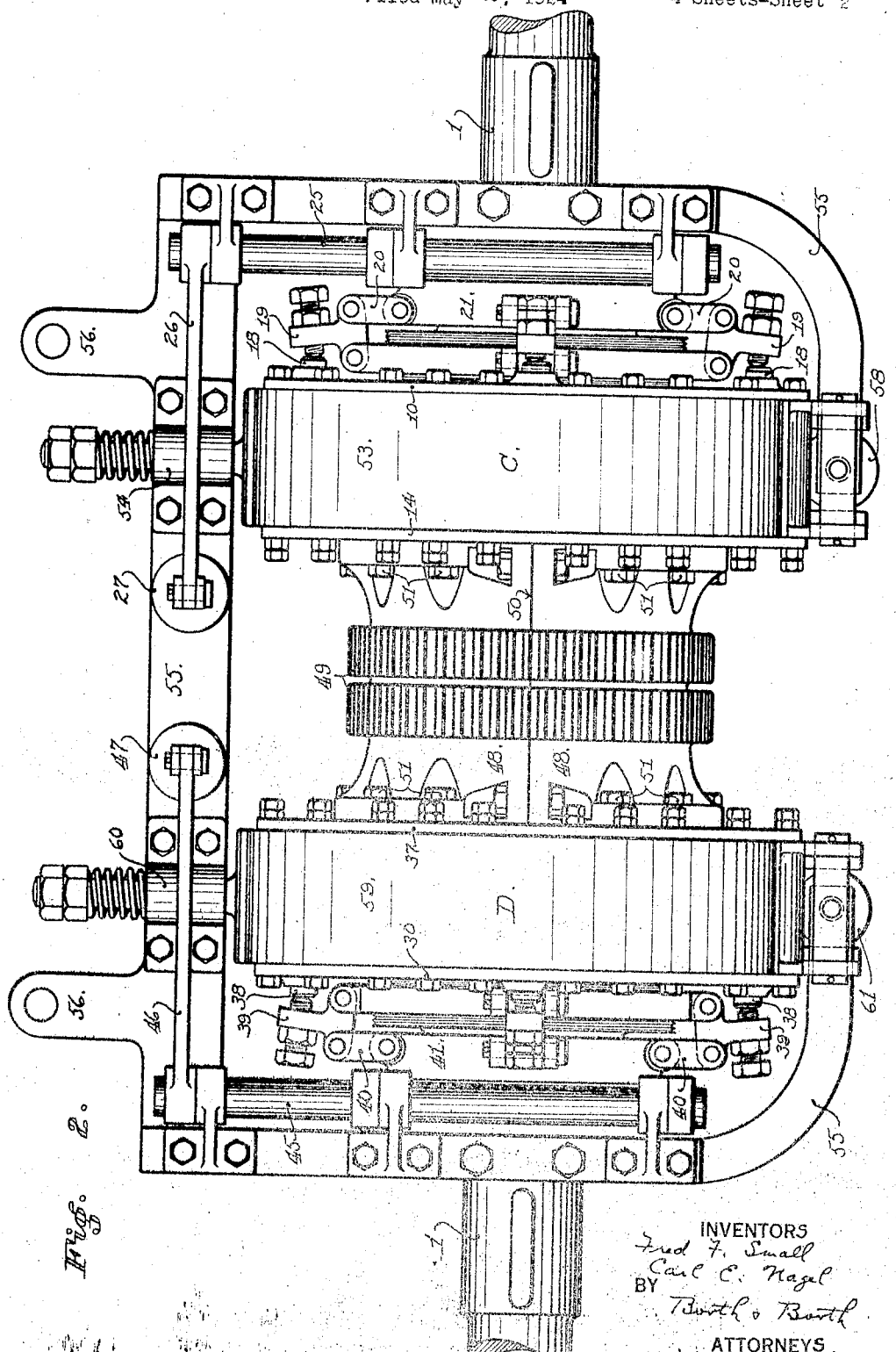

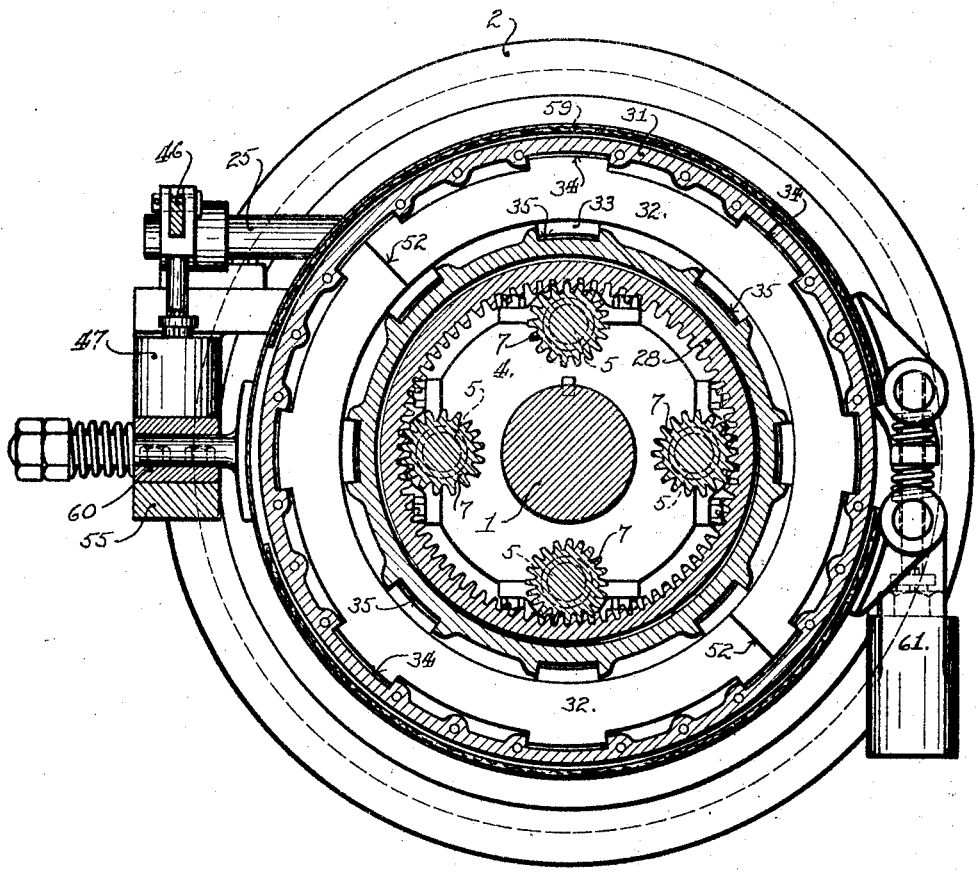

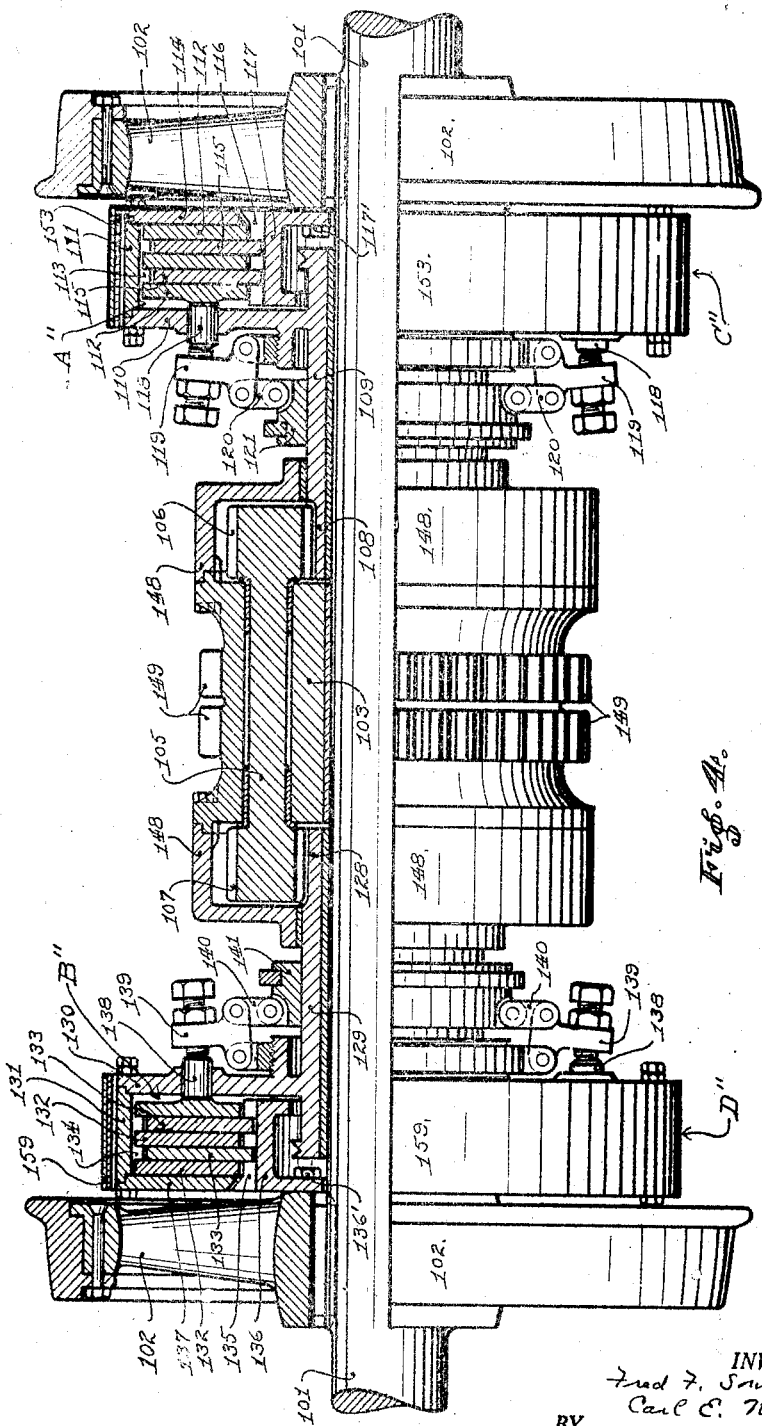

Patented July 7, 1925.

1,545,360

UNITED STATES PATENT OFFICE.

FRED F. SMALL AND CARL E. NAGEL, OF OAKLAND, CALIFORNIA.

MULTIPLE-SPEED PLANETARY-GEAR-TRANSMISSION MECHANISM.

Application filed May 29, 1924. Serial No. 716,559.

*To all whom it may concern:*

Be it known that we, FRED F. SMALL and CARL E. NAGEL, citizens of the United States, residing at Oakland, in the county of Alameda and State of California, have invented certain new and useful Improvements in Multiple-Speed Planetary-Gear-Transmission Mechanisms, of which the following is a specification.

Our invention relates to power transmitting mechanisms of the planetary or epicyclic type.

The object of our invention is to provide a transmission mechanism of the described type in which a plurality of different speed raitos between the driving and the driven members may be obtained with a minimum number of parts. For example, our invention enables three different speed ratios to be obtained with but one train of gears comprising two concentric gears of different diameters, and one or more planet pinions engaging with and connecting said gears. Moreover, by the addition of a third concentric gear meshing with the same set of planet pinions, four different speed ratios may be obtained, one of which causes the driven member to rotate in the reverse direction. On account of the small number of gears involved in its construction, not only are the friction losses in our transmission mechanism relatively small, but the costs of construction and of replacement are also reduced to a minimum, without sacrificing any of the well known advantages of planetary transmission mechanisms.

Broadly speaking, we achieve our described object by providing means for selectively connecting the members of the gear train with the driving or driven members of the mechanism, and means for selectively holding said gear train members stationary, thereby providing for a number of different combinative relations between the concentric gears and their connecting planet member, it being possible to make any one of the members of the gear train the stationary member, and connect either one of the remaining members with the driving member, the third member becoming or being connected with the driven member. In actual practise, it is usually sufficient to provide for the selective combination of but two members of the gear train.

For example, when the gear train comprises two concentric gears, of different diameters, and a connecting planet pinion member, it is usually preferable to mount the planet pinion member permanently in either the driven member or the driving member of the mechanism. Either one, or both, of the concentric gears may, however, be connected with the other member of the mechanism, and either one, or both, of said concentric gears may be held stationary. When both said gears are connected with the driving member or driven member, a direct drive, or a speed ratio of one to one, is obtained. The other selective combinations permit two other speed ratios to be obtained, the values thereof depending on the mutual arrangement of the gears.

Our invention is suitable for use in motor propelled vehicles of all descriptions. It is particularly applicable to heavy vehicles such as motor trucks, and busses, railway motor cars, and locomotives, in which it is highly desirable that the various speed ratio changes be made smoothly and without entirely disconnecting the load from the engine at any time. Planetary transmission mechanisms have not been used to any extent in such vehicles for the reason that, in order to obtain the necessary number of different speed ratios, the mechanism unavoidably became too complicated and involved too many moving parts with consequently large friction losses. By the use of devices embodying our invention, however, a perfectly practical and efficient three-speed transmission mechanism may be made, with or without reverse, for use in the heaviest vehicles.

It is to be understood, however, that our invention is not limited to the uses described above, but may be employed in any situation where a variable speed power transmitting mechanism is desired. It is also to be understood that the form and construction herein shown and described may be varied, within the limits of the claims hereto appended, without departing from the spirit of the invention as expressed in said claims.

With this in view our invention will now be fully described with reference to the accompanying drawings, wherein—

Fig. 2 is a plan view of the same.

Fig. 3 is a transverse section taken in the direction of the arrows on the line 3—3 of Fig. 1.

Fig. 4 is a side elevation, partly in section, of a modification of the device suitable for railway motor cars and the like, by means of which a different series of combinative relations is made possible between the members of the gear train and the driving and driven members, and which provides two forward speeds and one reverse.

Figure 1:
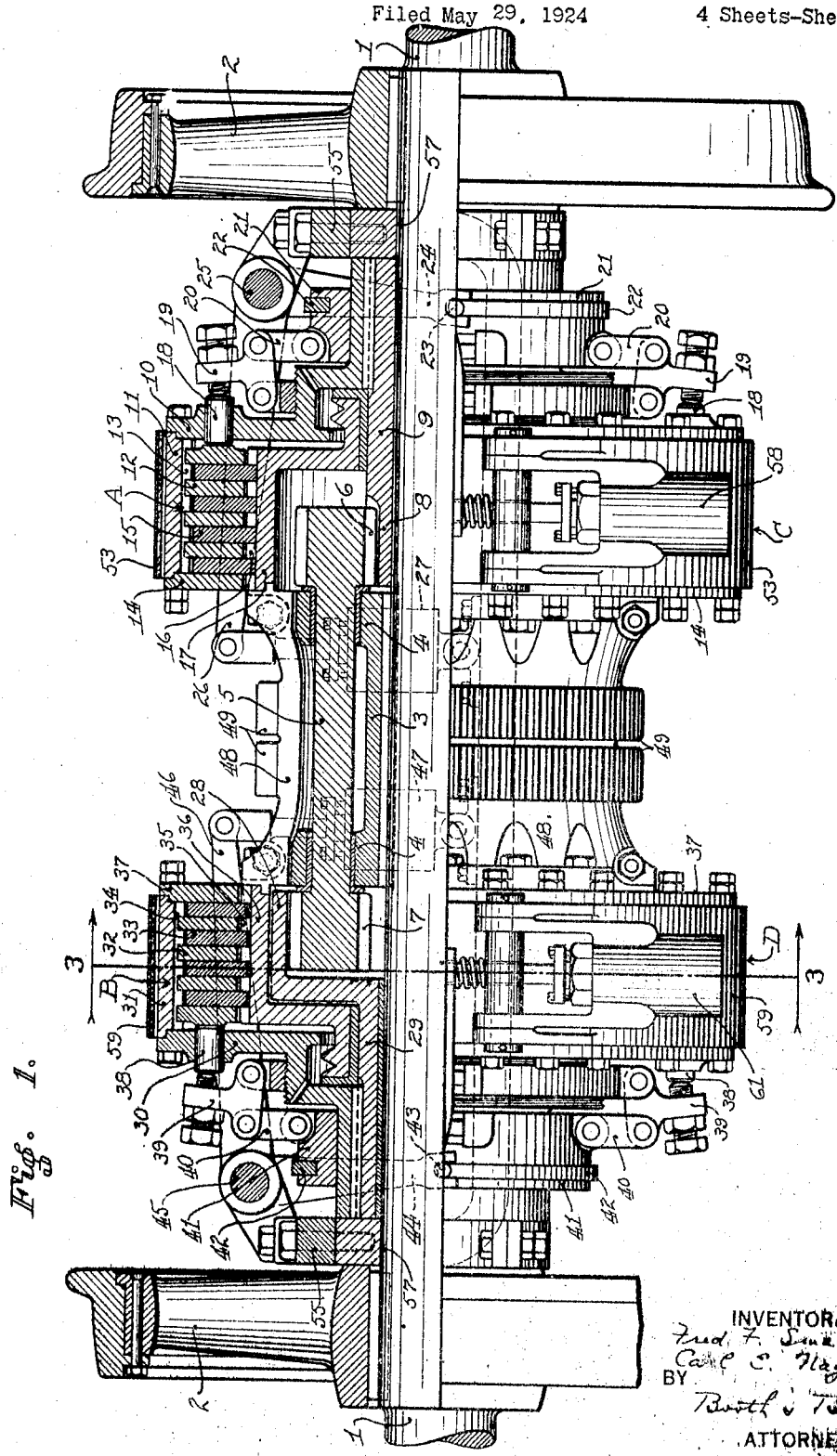
Fig. 1 is a longitudinal or side elevation, partly in section, of one form of device, embodying our invention, which is particularly adapted for railway motor cars and the like, and which provides three different speed ratios, without reverse.

In the drawings, and referring for the present to Figs. 1, 2 and 3 thereof, the reference numeral 1 designates a car axle, upon which are fixed the wheels 2. A hub 3 is keyed upon the axle 1 in its central region, and said hub is provided with spaced flanges or spiders 4 in which are journaled one or more shafts 5, each such shaft having formed upon its respective ends, or secured thereto, the planet pinions 6 and 7. The axle 1, with the planet pinion spider hub 3 secured thereto, constitutes the driven member of the mechanism.

The right hand planet pinions 6, Fig. 1, mesh with an external sun pinion 8, which is secured to or formed upon a sleeve 9 journaled upon the axle 1 to the right of the hub 3. Said sleeve has keyed upon it a flange 10, which forms one end plate of a clutch mechanism designated collectively by the letter A. A drum 11 is bolted to said plate 10, and carries within it a series of annular friction plates 12 which are freely keyed, as at 13, to said drum. An end plate 14 is bolted to the opposite end of the drum 11. A series of annular friction plates 15, alternating with the plates 12, are freely keyed, as at 16, upon the clutch hub 17, said hub being journaled upon the sleeve 9. The plates 12 and 15 are pressed into frictional engagement by slidable pins 18 carried in the end plate 10, and said pins are operated by adjustable bell cranks 19 and toggle links 20 from a sliding collar 21 surrounding the hub portion of said end plate 10. A thrust ring 22 is journaled in said collar, and is provided with opposite projecting bosses one of which is shown at 23, which are engaged by the forked ends of levers 24 secured upon a shaft 25, which in turn is rocked by a lever 26 and any suitable mechanism, as for example, a compressed air cylinder, as indicated at 27.

The left hand planet pinions 7 mesh with an internal gear 28 formed upon or fixed to a sleeve 29 journaled upon the axle 1 to the left of the spider hub 3. Said sleeve has keyed to it a flange 30 which forms one end plate of a clutch mechanism designated collectively by the letter B, and similar to the clutch A. Said clutch B has a drum 31 bolted to the plate 30, alternate annular friction plates 32 and 33 keyed respectively as shown at 34 and 35 to said drum and a hub 36, and an end plate 37 bolted to said drum. The friction plates 34 and 35 are pressed together by sliding pins 38 carried by the end plate 30, and said pins are operated by adjustable bell cranks 39, toggle links 40, and a sliding collar 41. Said collar has a thrust ring 42 with projecting bosses, one of which is shown at 43, engaged by levers 44 extending from a shaft 45 which in turn is rocked by means of a lever 46 and an air cylinder 47, all of said parts being similar to the corresponding parts of the clutch A.

The hubs 17 and 36 of the respective clutches A and B are connected together by a tubular member 48, upon which is formed or secured a sprocket 49 adapted for connection by a chain with the engine of the car, the chain and engine being omitted from the drawings. Said tubular member, with its sprocket and the clutch hubs 17 and 36, thus constitute the driving member of the mechanism. The tubular member 48 is preferably split longitudinally, as shown at 50 in Fig. 2, to facilitate the disassembling of the device, and is secured to the clutch hubs 17 and 36 by bolts 51. For the same purpose, the friction plates of the clutches may be divided diametrically, the division of one of the plates 32 being shown at 52 in Fig. 3. The various plate portions are held in position by their respective keys.

The drum 11 of the clutch A is provided with a brake mechanism designated collectively by the letter C. Said brake comprises a contractible band 53, Figs. 1 and 2, surrounding the drum 11, and anchored in the usual manner at 54, Fig. 2, to a frame 55, which partially encircles the entire mechanism and is provided with ears or lugs 56 by which it may be connected to any suitable brace member, not shown, for retaining it in position. Said frame is journaled upon the axle 1 at 57, Fig. 1. The brake band 53 is operated by any suitable mechanism, as for example, an air cylinder device indicated at 58 in Figs. 1 and 2. Similarly, the drum 31 of the clutch B is provided with a brake mechanism D, comprising a contractible band 59, Figs. 1, 2 and 3, anchored to the frame 55 at 60, Figs. 2 and 3, and operated by an air cylinder device 61.

It should be understood in this connection that the clutches A and B and the brakes C and D may be constructed and operated in any suitable manner, the particular construction described above being well known in the art and used herein merely as a typical example.

It will be seen that, by means of the clutches A and B and the brakes C and D, either the sun pinion 8 or the internal gear 28 may be connected with the driving member or sprocket 49, and the other held stationary, thus causing the planet pinion spider hub 3 and the axle 1 to rotate. If the sun pinion 8 is connected with the driving member 49, by the clutch A, and the internal gear 28 is held stationary by the brake D, the planet pinion hub 3 and the axle 1 will rotate, in the same direction as said driving member 49, but at a considerably reduced speed. For example, if the planet pinions 6 and 7 have the same pitch diameter, and if the ratio between the pitch diameter of said planet pinions and that of the sun pinion 8 and the internal gear 28 is one to two to four, then with said sun pinion connected with the driving member 49 and said internal gear held stationary, the speed ratio between said driving member and the axle 1 will be three to one. On the other hand, if the internal gear 28 is connected to the driving member 49 by the clutch B, and the sun pinion 8 held stationary by the brake C, the axle 1 will still rotate in the same direction, but at a less reduced speed, the ratio being three to two. Then if both clutches A and B are engaged, and both brakes C and D released, the whole mechanism, including the axle 1, will rotate as a unit at the speed of the driving member 49. Thus three different speed ratios are possible with but one simple train of gears, on account of the provision of two clutches and two brakes, rendering it possible to connect either the sun pinion 8 or the internal gear 28 with the driving member, and hold the other stationary. Obviously, when both clutches are released, the driving member 49 rotates idly, and no power is transmitted to the axle 1.

The mechanism also provides, without additional parts, effective means for braking the car or vehicle to which it is applied. Thus when idling, with both clutches A and B released, the application of both brakes C and D will effectively brake the axle 1, while when operating on the direct drive, with both clutches A and B engaged, either or both brakes C and D may be used to brake the axle 1. In the low speed position, i. e. with the clutch A and the brake D engaged, the axle 1 may be braked by the brake C, and similarly in the intermediate speed, i. e. with the clutch B and the brake C engaged, braking may be done with the brake D.

In Fig. 4 of the drawings we have shown a second modification of the device which has the same general applications as the form shown in Figs. 1, 2 and 3, and which illustrates the use of a different series of combinative relations between the members of the gear train. This modified form also provides two forward speeds and one reverse speed with the use of but two concentric gears and one or more planet pinion members connecting said gears.

In said Fig. 4, a hub or spider 103 is rotatively mounted upon the driven shaft or axle 101, upon which axle the wheels 102 are secured. The spider 103 carries one or more rotatively mounted shafts, one of which is shown at 105, and upon the ends of which are formed or secured the respective planet pinions 106 and 107.

The planet pinion 106 meshes with an external sun pinion 108, formed upon a sleeve 109. Said sleeve is journaled upon the axle 101 to the right of the spider 103, and carries a flange 110 which forms one end plate of a clutch mechanism designated collectively by the letter A''. A drum 111 is secured to the plate 110, and has freely keyed within it, as indicated at 113, a series of friction plates 112, and said drum also has secured to it an opposite end plate 114. An intervening series of friction plates 115 are freely keyed, as indicated at 116, upon a hub 117, said hub being secured to the right hand wheel 102 as shown at 117'.

The clutch A'' is operated by any suitable mechanism, such mechanism for example, comprising slidably mounted pins 118 carried in the end plate 110 and engaged by adjustable bell cranks 119 which are connected by toggle links 120 with a sliding collar 121 mounted upon the sleeve 109.

The left hand planet pinion 107, which has a slightly smaller pitch diameter than that of the planet pinion 106, meshes with an external sun pinion 128 formed upon a sleeve 129 journaled about the left hand end portion of the axle 101. Said sleeve carries the end plate 130 of a clutch mechanism designated collectively by the letter B''. Said plate 130 has secured thereto a drum 131, and within said drum are alternately disposed friction plates 132 and 133, freely keyed respectively, as indicated at 134 and 135, to said drum and a hub 136. Said hub is secured as shown at 136' to the left hand wheel 102. An opposite end plate 137 secured to the clutch drum 131.

The clutch B'' is controlled by mechanism similar to that described above and comprising slidable pins 138 mounted in the end plate 130 and operated by adjustable bell cranks 139, toggle links 140 and a sliding collar 141 mounted upon the sleeve 129. It is understood that the clutch operating collars 121 and 141 may be actuated by any suitable mechanism, not shown.

The hub 103, in which the planet pinion shafts 105 are journaled, is provided with drum-like housings 148 enclosing the planet pinions and the sun pinions meshing therewith and said hub has formed upon it a sprocket 149 adapted for connection with the engine of the vehicle, said engine and its connection with said sprocket being omitted from the drawings. The hub 103, carrying the planet pinion members comprising the planet pinions 106 and 107 and their connecting shafts 105, thus becomes the driving member of the mechanism.

The drum 111 of the clutch A″ is provided with a brake mechanism comprising any suitable parts, of which only a band 153 surrounding and operating upon said drum is shown. Similarly the drum 131 of the clutch B″ is provided with a suitable brake mechanism of which only a band 159 surrounding said drum is shown. The brake mechanism associated with the drum 111 of the clutch A″ is designated collectively by the letter C″ and that associated with the drum 131 of the clutch B″ is designated by the letter D″.

It is to be noted that the last described form of mechanism differs from the form shown in Figs. 1, 2 and 3 of the drawings, and described with reference thereto, in having the planet pinion members permanently mounted in the driving member of the mechanism instead of in the driven member, as is the case in said previously described form. The clutches A″ and B″ operate to selectively connect the respective concentric gears or sun pinions 108 and 128 with the driven member or axle 101. The operation of this last described form of mechanism is therefore essentially similar to that of the first described form, except that the mounting of the planet pinion members in the driving member of the mechanism enables the use of a different series of combinative relations between the various interconnected elements of the device.

Moreover, the use of this series of combinative relations permits us to provide two forward speeds and one reverse speed with the single train of gears consisting of the two concentric sun pinions 108 and 128 and the connecting planet pinion members. Thus, for example, if the relative pitch diameters of the several members of the gear train are assumed to be as follows, namely, 3½ for the planet pinion 107, 4 for the planet pinion 106, 8½ for the sun pinion 108, and 9 for the sun pinion 128, then by connecting the sun pinion 108 with the driven member 101, by means of the clutch A″, and holding the sun pinion 128 stationary by means of the brake D″, the driven member or axle 101 will rotate in a direction opposite to that of the driving member 149 and will have a speed ratio thereto of 1 to 4.7. If the sun pinion 128 is connected with the axle 101 through the clutch B″, and the sun pinion 108 is held stationary by the brake C″, then said axle will rotate in the same direction as the driving member 149, and at a speed ratio thereto of 1 to 5.75. As in the previous forms of the device, if both clutches A″ and B″ are engaged to connect both sun pinions with the driven member 101, the direct drive, or a speed ratio of 1 to 1, is obtained, and if both said clutches are disengaged, no power is transmitted. Braking of the axle 101 may be effected by the use of the brake mechanisms C″ or D″, as in the previously described forms of the mechanism.

We claim:

1. A device for the described purpose comprising a driven shaft; a pair of concentric gears journaled about said shaft and spaced longitudinally thereupon; a spider fixed upon said shaft between said gears; a shaft journaled in said spider; a planet pinion fixed upon each end of the last mentioned shaft, one such pinion meshing with each of said concentric gears; a hollow driving member surrounding said spider; a clutch associated with each end of said driving member for connecting the same selectively with said concentric gears; and means for selectively holding said gears stationary.

2. A device for the described purpose comprising a driven shaft; a pair of concentric gears journaled about said shaft and spaced longitudinally thereupon; a spider fixed upon said shaft between said gears; a shaft journaled in said spider; a planet pinion fixed upon each end of the last mentioned shaft, one such pinion meshing with each of said concentric gears; a hollow driving member surrounding said spider, said driving member being divided longitudinally; clutches associated with said driving member for connecting the same selectively with said concentric gears; and means for selectively holding said gears stationary.

3. A device for the described purpose comprising a driven shaft; a pair of concentric gears journaled about said shaft and spaced longitudinally thereupon; a spider fixed upon said shaft between said gears; a shaft journaled in said spider; a planet pinion fixed upon each end of the last mentioned shaft, one such pinion meshing with each of said concentric gears; a hollow driving member surrounding said spider; a clutch associated with each end of said driving member for connecting the same selectively with said concentric gears; a drum connected with each of said gears; and a brake associated with each of said drums for holding the same stationary.

4. A device for the described purpose comprising a driven shaft; a pair of concentric gears journaled about said shaft and spaced longitudinally thereupon; a spider fixed upon said shaft between said gears; a shaft journaled in said spider; a planet pinion fixed upon each end of the last mentioned shaft, one such pinion meshing with each of said concentric gears; a hollow driving member surrounding said spider; a clutch associated with each end of said driving member for connecting the same selectively with said concentric gears; a drum connected with each of said gears, each drum enclosing its connected gear and the clutch associated therewith; and a brake associated with each of said drums for holding the same stationary.

5. In a device for the described purpose, a driven member comprising a shaft; a pair of sleeves journaled thereupon in spaced relation; a gear carried by each sleeve, said gears being co-axial with said shaft; a driving member comprising a housing surrounding and enclosing said gears and having closed ends journaled upon said sleeves; means for selectively connecting said gears with one of said members; a planet pinion member carried by the other first mentioned member, and adapted to mesh with and connect said gears, said planet pinion member being enclosed within said driving member; and means associated with said sleeves for selectively holding said gears stationary.

6. A device for the described purpose comprising a driven shaft; a pair of concentric gears journaled about said shaft; a spider fixed upon said shaft; a planet pinion member rotatably carried by said spider and adapted to mesh with and connect said concentric gears; a hollow driving member surrounding said spider; means for selectively connecting said driving member with said concentric gears; and means for selectively holding said gears stationary.

7. A device for the described purpose comprising a driven shaft; a pair of concentric gears journaled about said shaft; a spider fixed upon said shaft; a planet pinion member rotatably carried by said spider and adapted to mesh with and connect said concentric gears; a hollow driving member surrounding said spider; a clutch associated with each end of said driving member for connecting the same selectively with said concentric gears; and means for selectively holding said gears stationary.

8. In a device for the described purpose, a driven shaft; a driving member journaled about said shaft; a pair of concentric gears journaled about said shaft; means for selectively connecting said gears with said driving member; means for selectively holding said gears stationary; and a planet pinion member carried by the driven shaft and adapted to mesh with and connect said concentric gears.

In testimony whereof we have signed our names to this specification.

FRED F. SMALL.
CARL E. NAGEL.